US007469508B2

(12) United States Patent  
Ceria

(10) Patent No.: US 7,469,508 B2
(45) Date of Patent: Dec. 30, 2008

(54) INSULATING PANEL AND PHOTOVOLTAIC MODULE FOR BUILDING PURPOSES

(75) Inventor: Esterino Ceria, Turin (IT)

(73) Assignee: Isolpack S.p.A., Turin (IT)

( * ) Notice: Subject to any disclaimer, the term of this patent is extended or adjusted under 35 U.S.C. 154(b) by 511 days.

(21) Appl. No.: 10/953,540

(22) Filed: Sep. 30, 2004

(65) Prior Publication Data

US 2005/0144903 A1 Jul. 7, 2005

(30) Foreign Application Priority Data

Dec. 23, 2005 (IT) .......................... TO2003A1035

(51) Int. Cl.
*E04D 13/18* (2006.01)
(52) U.S. Cl. ..................... 52/173.3; 136/244
(58) Field of Classification Search ................ 52/309.7, 52/309.9, 309.16, 173.3, 220.8, 404.1, 794.1, 52/537, 3, 745.2, 783.11, 783.17, 783.19, 52/795.1; 244/173; 136/251, 206, 244; 440/6; 126/621–623
See application file for complete search history.

(56) References Cited

U.S. PATENT DOCUMENTS

| 2,964,821 | A | * | 12/1960 | Meehan ...................... 425/110 |
| 3,374,590 | A | * | 3/1968 | Kessler ...................... 52/220.7 |
| 3,399,503 | A | * | 9/1968 | Payne et al. ................. 52/406.1 |
| 4,233,962 | A | * | 11/1980 | Neny ........................... 126/662 |
| 4,271,818 | A | * | 6/1981 | Hastwell ..................... 126/621 |
| 4,378,789 | A | * | 4/1983 | Vironneau ................... 126/654 |
| 4,466,424 | A | * | 8/1984 | Lockwood, Jr. ............. 126/621 |
| 4,636,577 | A | | 1/1987 | Peterpaul |
| 5,289,999 | A | | 3/1994 | Naujeck et al. |
| 5,771,645 | A | * | 6/1998 | Porter ........................ 52/220.2 |
| 5,842,315 | A | * | 12/1998 | Lin ............................ 52/309.9 |
| 5,935,343 | A | * | 8/1999 | Hollick ....................... 136/246 |
| 6,201,179 | B1 | * | 3/2001 | Dalacu ........................ 136/244 |
| 6,365,824 | B1 | * | 4/2002 | Nakazima et al. ........... 136/251 |
| 6,408,594 | B1 | * | 6/2002 | Porter ........................ 52/794.1 |
| 6,501,013 | B1 | * | 12/2002 | Dinwoodie ................. 136/251 |
| 2002/0112419 | A1 | | 8/2002 | Dorr et al. |
| 2004/0074153 | A1 | * | 4/2004 | Ceria .............................. 52/3 |

FOREIGN PATENT DOCUMENTS

| EP | 0693599 A | 1/1996 |
| EP | 0981167 A | 2/2000 |
| JP | 10 219949 A A | 8/1998 |

* cited by examiner

*Primary Examiner*—Robert Canfield
*Assistant Examiner*—Bryan Eppes
(74) *Attorney, Agent, or Firm*—Sughrue Mion, PLLC

(57) ABSTRACT

A prefabricated insulating panel (5) for the construction of external surfaces of buildings comprises two sheets of metal material (6, 7'), between which an insulating material (8') is set, where at least one of the two sheets (6', 7') defines a plurality of substantially parallel longitudinal ribbings (10A', 10B'). According to the invention, at least a first (10B') and a second (10A') of said ribbings are operative for supporting between them at least a photovoltaic module (14) in a plane of lie raised with respect to a general plane of the panel (5); between the two sheets (6', 7') there is moreover present at least one pipe (13) for the passage of cables (18) for electrical connection of the photovoltaic module (14).

20 Claims, 5 Drawing Sheets

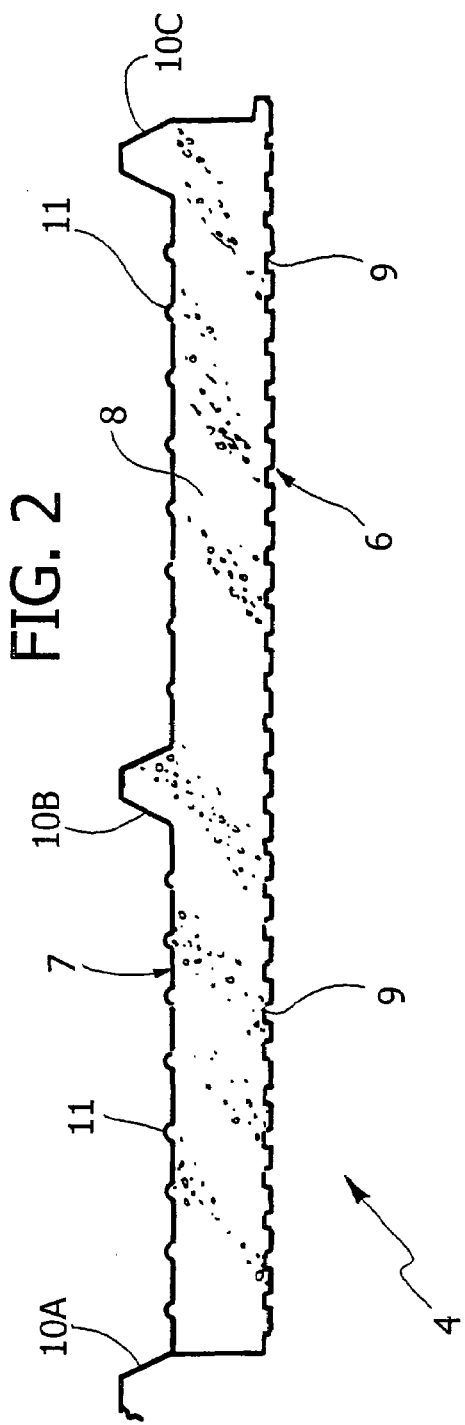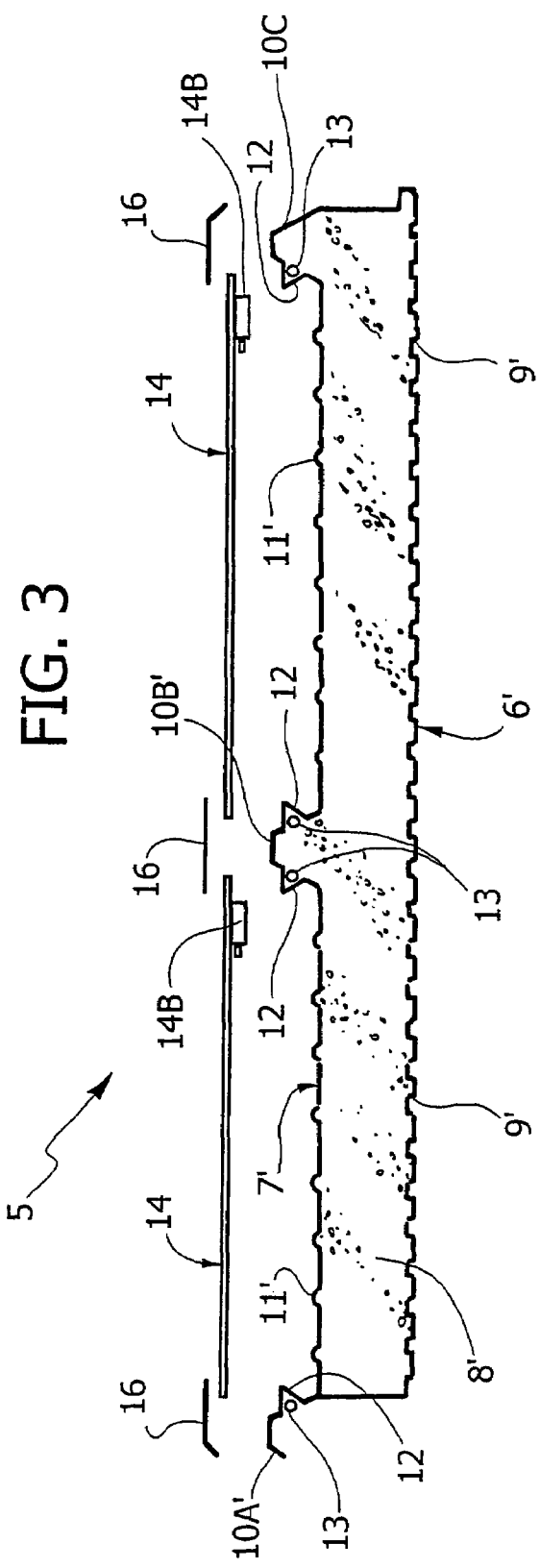

INSULATING PANEL AND PHOTOVOLTAIC MODULE FOR BUILDING PURPOSES

FIELD OF THE INVENTION

The present invention relates to the sector of insulating panels for the building industry.

BACKGROUND OF THE INVENTION

For the purposes of covering or constructing external surfaces of buildings there are widely used components in the form of modular panels that can be put together, which must present good characteristics of tightness to infiltration, thermal insulation and mechanical resistance. The structure of said panels typically consists of a layer of insulating material, for example, fibreglass or polyurethane resin, set between two metal sheets. Said structure must enable a good modularity to be achieved, understood as the possibility of coupling a number of panels to one another to obtain a continuous covering surface. For this purpose, the panels are usually rectangular and are prearranged for being coupled alongside one another, along the respective long sides. Said structure must moreover enable panels to be made of dimensions very different from one another, without causing thereby significant modifications in the production cycle, which is preferably a cycle of a continuous type.

The interest in renewable energy sources has in recent times assumed increasing importance, above all with reference to the exploitation of solar energy via photovoltaic devices. As is known, the operation of photovoltaic devices is based upon the capacity of some appropriately treated semiconductor materials (for example, silicon) for converting the energy of solar radiation into d.c. electrical energy, without any need for mechanical parts in motion. The basic component of a photovoltaic system is the photovoltaic cell, and a number of cells assembled and connected together in a single structure form a photovoltaic module. The most common modules consist of 36 cells connected in series, assembled between a top layer of glass and a bottom layer of plastic material (usually Tedlar), and enclosed within a metal frame, usually made of anodized aluminium. The structure thus formed is strong and is able to guarantee many years of operation. In the rear part of the module there is usually located a so-called junction box, in which electrical components, such as diodes, fuses, overload-protection systems, etc., are housed, as well as contacts or terminals for electrical connection of a number of modules in series or in parallel. According to the voltage desired for the system, a number of modules can be connected in series, in a so-called "string". The electric power requirement then determines the number of strings to be connected in parallel for providing a photovoltaic generator. The transfer of energy from the photovoltaic system to the electrical loads usually occurs through additional devices, necessary, for example, for accumulating, transforming, and/or adapting the direct current produced by the photovoltaic modules to the requirements of the end user. An essential component in this sense, if, that is, the loads have to be supplied with alternating current, is the inverter, a device that converts the direct current at output from the photovoltaic generator into alternating current.

At the current state of the art, the provision of a photovoltaic generator on surfaces of a building formed using prefabricated insulating panels of the type referred to previously entails some problems.

In the first place, the various photovoltaic modules necessary for formation of the generator call for an adequate supporting framework, the components of which must, for example, be designed according to the characteristics of the roof. Once made, said components must be assembled together, in order to obtain the framework, and anchored on the roof. This is followed by the installation of the various modules on the framework, as well as the execution of the necessary electrical connections of the various modules in series or in parallel.

The consequence of said known art is that the operations necessary for installation and anchorage of the framework, for installation of the various modules on the framework, and for electrical connection of the modules must be performed directly on the roof of the building, or in any case in suboptimal working conditions and frequently in conditions of potential danger. The fact that the persons responsible for carrying out installation find themselves operating in such critical conditions is detrimental to the speed and quality of pre-arrangement of the system. This results basically in an increase in the times and overall costs of installation of the photovoltaic system.

SUMMARY OF THE INVENTION

In its general terms, the present invention proposes the solution of one or more of the drawbacks referred to above, in a simple, inexpensive, and efficient way.

The above and other purposes are achieved, according to the present invention, by an insulating panel for the building industry, by a system for the construction of external surfaces of buildings, and by a method for the construction of external surfaces of buildings having the characteristics specified in the annexed claims, which are to be understood as forming an integral part of the present description.

BRIEF DESCRIPTION OF THE DRAWINGS

Further purposes, characteristics and advantages of the present invention will emerge clearly from the ensuing detailed description and from the annexed drawings, which is provided purely by way of explanatory and non-limiting example and in which:

FIG. 2 is a schematic cross-sectional view of an insulating panel of a known type;

FIG. 3 is a partially exploded schematic cross-sectional view of an insulating panel according to the invention;

DETAILED DESCRIPTION OF PREFERRED EMBODIMENTS OF THE INVENTION

Figure 1:
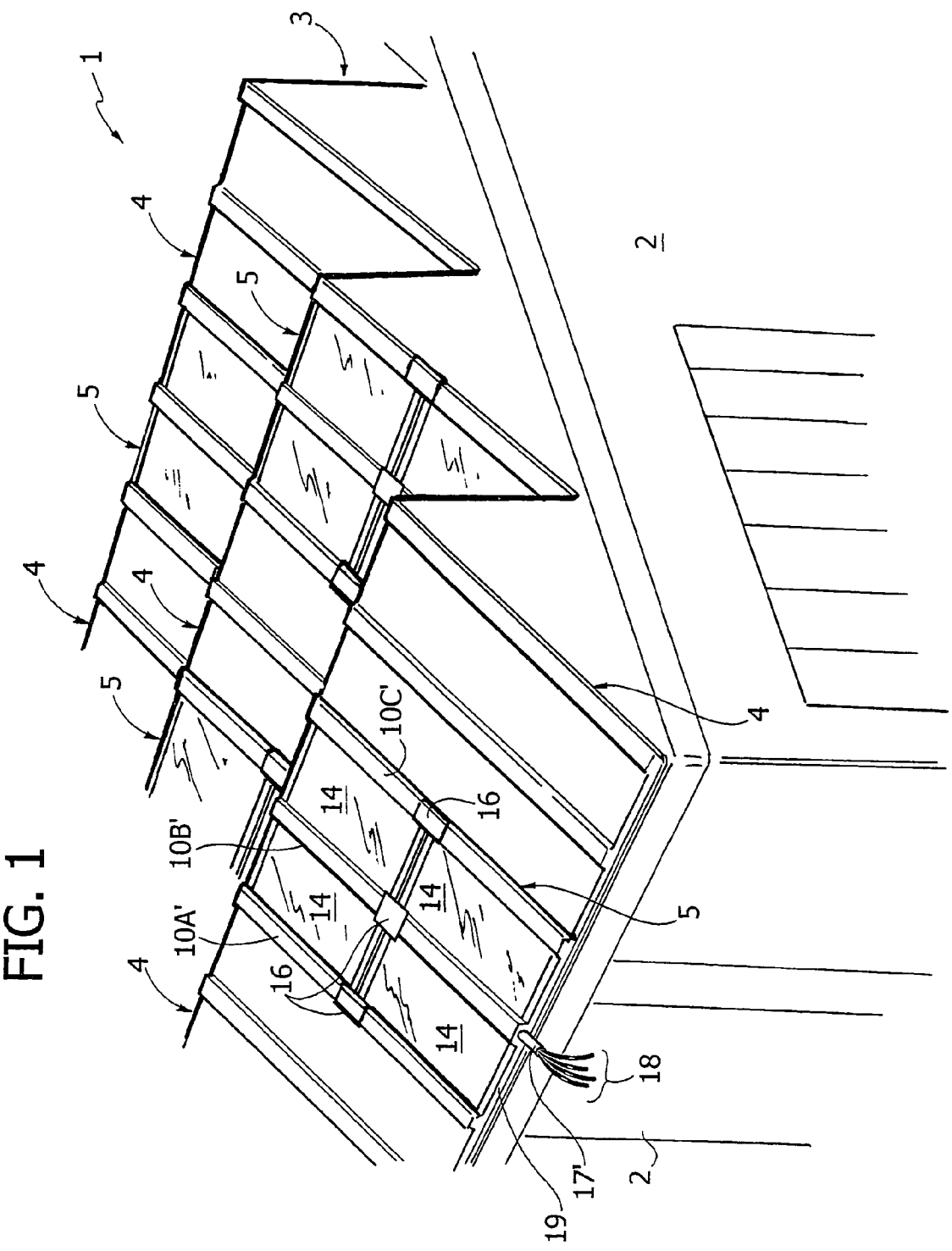
FIG. 1 is a partial perspective view of a generic building, with a top covering which uses insulating panels built according to the teachings of the present invention.

In FIG. 1, the reference number 1 designates as a whole a generic building, which is herein supposed as being an industrial shed. The building 1 has side surfaces or walls, designated by 2, and a typical shed roof 3, i.e., one formed by a succession of double-pitch roofs, of which one pitch is inclined and the other is close to the vertical. The inclined pitches are coated or formed by prefabricated insulating panels of a substantially known type, designated by 4, and prefabricated insulating panels built in accordance with the invention, designated by 5.

The panels 4 and 5 are mounted alongside one another, i.e., side by side. The longitudinal development of the panels 4, 5 is continuous, in the sense that each of them extends substantially from the ridge of the roof as far as the bottom edge of the respective inclined pitch. The means for making the sealed side joint between the panels 4, 5, as well as the means for forming the anchorage in position of the panels themselves are not represented and described herein, in so far as they are of a conception in itself known.

FIG. 2 represents, in cross-sectional view, a panel 4, the structure of which is preferably formed by a bottom metal sheet 6 and a top metal sheet 7, between which there is set a layer or mass of insulating or non-conducting material 8. The layer 8 can be made, for example, of self-extinguishing polyurethane resin or polyisocyanide foam or with flame-retardant additive. The very bonding capacity of the foamed material used can be advantageously exploited for fixing together the cited components 6-8 of the panel 4 in order to obtain a substantially monolithic structure and thus eliminate the need for welded or mechanical connections.

Both of the sheets 6 and 7 can be obtained via rolling starting from sheet metal, for example made of stainless or galvanized steel, or made of aluminium or copper, possibly painted or subjected to other forms of surface treatment. The sheets 6 and 7 are corrugated; i.e., they have parallel ribbings in a longitudinal direction, which extend substantially throughout the length of the sheets themselves. For said purpose, in the course of the step of shaping of the bottom sheet 6, in the latter there can be defined parallel longitudinal ribbings, which are equal to one another, designated by 9. Likewise, in the course of shaping of the top sheet 7, there are defined, in the latter, deep longitudinal ribbings and shallow longitudinal ribbings, which rise from a general plane of the sheet itself so that the top surface of the panel 4 presents a recurrent pattern. In the case exemplified, the panel 4 envisages three deep ribbings, designated by 10A, 10B and 10C, having a substantially trapezoidal cross-sectional shape, whilst the shallow ribbings, designated by 11 have a prevalently semicircular cross section, where, between two deep ribbings there extends a plurality of shallow ribbings in the same longitudinal direction.

Even though this is not strictly indispensable for the purposes of the construction of a panel 4, in the case exemplified in FIG. 2 the sheets 6, 7 are shaped for "closing" laterally the space designed for containing the insulating mass 8. At one end of the panel 4, the sheet 7 is shaped for forming part of a deep ribbing 10A outside said space; note that said external ribbing could be formed by the sheet 6.

According to an important aspect of the present invention, the panels 5 are conceived for integrating one or more photovoltaic modules.

FIG. 3 represents a schematic cross section of a panel 5. The basic structure of said panel 5 is obtained substantially adopting modalities similar to the ones previously described with reference to the panel 4 of FIG. 2. Consequently, in the following figures the same reference numbers as the ones appearing in FIG. 2 will be used to designate elements that are technically equivalent to the ones already described, with the addition of the prime superscript.

Also the panel 5 has a structure preferably formed by a bottom metal sheet 6' and a top metal sheet 7', between which is set a layer of insulating or non-conducting material 8'.

In the case exemplified, in the course of forming or shaping of the top sheet 7', in a position corresponding to each inclined side of the central deep ribbing 10B' there is formed a respective longitudinal projection or corrugation 12. In the embodiment represented, similar projections 12 are formed in the inclined sides of the side ribbings 10A' and 10C' facing the central ribbing 10B'. Once again in the case exemplified, and as may be seen in detail also in FIG. 4, the projections 12 have a substantially triangular cross section, with one side set horizontal, which forms a sort of bracket or cantilever. Within each projection 12 there is present a duct or piping, for example consisting of a tube made of plastic material designated by 13.

Figure 4:
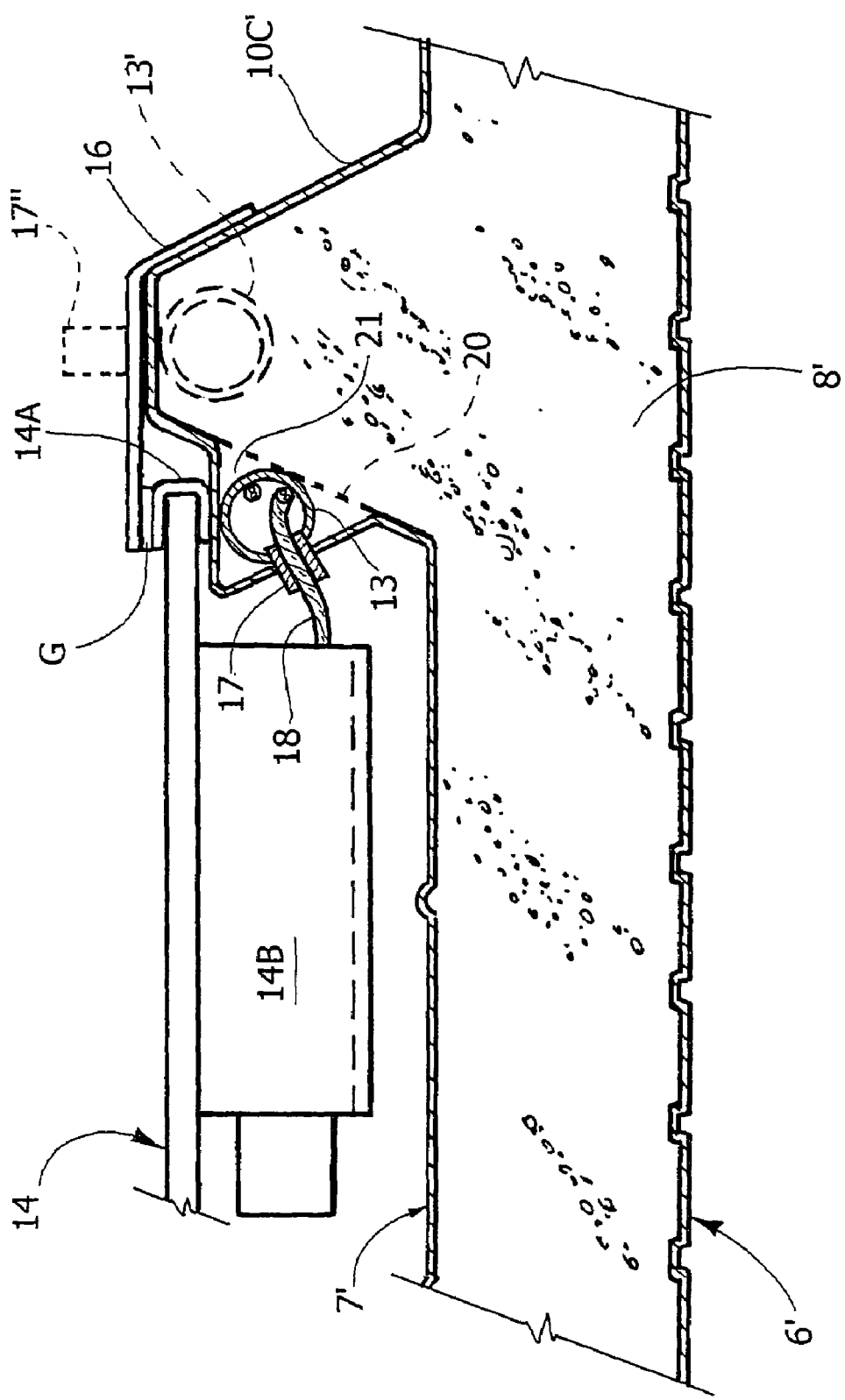
FIG. 4 is a partial and schematic cross-sectional view, at an enlarged scale with respect to FIG. 3, of an insulating panel according to the invention.

The aforesaid "cantilever" projections 12 constitute areas of resting for opposite side edges of the photovoltaic modules, designated as a whole by 14 in FIGS. 1, 3 and 4. Said modules 14 are built in a way in itself known, as explained in the introductory part of the present description, for example comprising a plurality of photovoltaic cells connected in series, assembled between a top layer made of transparent material and a bottom layer made of plastic material, and enclosed by a metal frame, designated by 14A. In the rear part of each module there is provided a junction box, designated by 14B.

The position of the projections 12 is such that the modules 14 are raised with respect to the general plane of the sheet, i.e., with respect to the plane of the areas in which the shallow ribbings 11' are formed. In this way, the modules 14, the deep ribbings 10A', 10B', 10C', and the part of the sheet 7' that extends between the ribbings themselves delimit ventilation chambers, designated by 15, within which there are located also the junction boxes 14A of each module 14.

As may be seen in FIG. 4, the peripheral frame 14A is designed to remain resting on the horizontal surface of the respective projection 12. To the respective deep ribbing, in the case exemplified at the top of the ribbing 10C', there is then fixed a bracket 16 for clamping the module 14 to the panel 5, with possible interposition of a gasket or resilient element G. Fixing of the bracket 16 may be obtained using self-threading screws (not represented), with suitable seal gaskets or with subsequent apposition of sealing material, preferably in areas of the respective ribbing 10A', 10B', 10C' not close to the position of the tube 13.

A substantial advantage afforded by the present invention is constituted by the fact that the panels 5 equipped with the respective photovoltaic modules 14 can be fabricated completely in the factory. For said purpose, there is first formed the metal structure of a panel 5, so that in the space delimited between the sheets 6', 7', and in particular within the projections 12, there is positioned the tube 13, previously obtained from plastic material. Said space is subsequently "foamed", or in any case filled with the insulating mass 8', which maintains in position the tube 13 within the respective projection 12. In suitable points of the panel 5 there are subsequently formed holes for installation of cable-leads or glands or similar substantially tubular seal members, of a type in itself known, one of which is designated by 17 in FIG. 4. In the case of FIG. 4, the aforesaid holes are formed in the sheet 7', in a position corresponding to a projection 12, and in the wall of the tube 13 so as to be able to fix a respective gland or cable-lead 17. Obviously, the number and the disposition of the cable-leads 17 will depend upon the number and upon the position of the modules 14 that are mounted on of a single panel 5. It should, however, be borne in mind that one and the same cable-lead 17 can be exploited for the passage of the electrical cables for a number of panels. In the cable-leads 17 there are then inserted the cables designed to be connected to a respective junction box 14B. One end of each of said cables (one of which is designated by 18 in FIG. 4) is connected to the respective box 14B, whilst the other end is made to come out of the end of the tube 13 that is set in a position corresponding to one longitudinal end of the respective panel 5, for example as may be seen schematically in FIG. 5. At this point, the module or modules 14 provided for the panel 5 are positioned on the respective projections 12 and fixed thereto in position, as previously explained, via the brackets 16. At this point, then, the panel 5 is formed and comprises a monolithic structure, consisting of the sheets 6', 7' and the respective insulating mass 8', with associated thereto one or more photovoltaic modules 14, the wiring 18 of which passes in the pipe present in the insulating core and is ready for connection in series or in parallel according to the needs.

Subsequently, for example in the installation stage, the panel 5 will be equipped, at the respective longitudinal ends, with endpieces or, in any case, with suitable complements for closing the internal space in which there is present the insulating mass 8'. One such closing complement is schematized in FIG. 1 and designated by the reference number 19. At least one of said complements 19 will be equipped with one or more cable-leads 17', mounted in a position corresponding to one end of a respective tube 13, in order to enable exit of the relevant wiring 18 of the various modules 14 mounted on the respective panel, as schematized in FIG. 1.

As may be appreciated, a substantial advantage of the invention lies in the fact that the panel 5, equipped with the respective modules 14, can be entirely built and assembled in the factory. There are consequently evident the advantages in terms of working safety and quality. The operator who pre-arranges the modules 14 on the panel 5 can in fact operate in optimal conditions and in complete tranquillity, since he is not on the roof of a building or in any case in conditions of potential danger, it thus being possible for him to devote his complete attention to the pre-arrangement of the panel 5. Once the panel 5 has been obtained as described previously, it can finally be transported onto the building site and then mounted in order to obtain the desired pitches, with modalities altogether similar to the ones adopted for the installation of the panels 4 of a known type.

For the purposes of covering or obtaining inclined pitches of the building 1, the panels 4, 5 are mounted alongside one another, i.e., side by side, as represented in FIG. 1. As has been said, anchorage of the panels 4, 5 with respect to the underlying structure of the building 1 can be obtained with methodologies and means in themselves known, such as the longitudinal sealing joint between the panels. For said purpose, the ribbing 10A, 10A' of a panel 4, 5 will be fitted on the ribbing 10C, 10C' of the adjacent panel 4, 5. The covering or roof can finally be completed at the side ends of the panels 4, 5 via suitable complements, such as the endpieces 19, or suitable sealing borders, edgings, or gutters. In the case exemplified in FIG. 1, the panels 5 are mounted alternately with traditional panels 4. This possibility is obviously provided, purely by way of example, in so far as nothing prevents making entire areas of a roof, or, even, the entire roof, using only the panels 5.

After installation of the panels 5, the various cables 18 at output therefrom will be guided via suitable ducts or guides associated to the structure of the building, which are not represented in so far as they are of a type in itself known, up to a respective point for connection, for example with an electrical load, or with an accumulator, or with an inverter, etc. Said aspects, which pertain prevalently to the construction of the electrical wiring system of the building 1, are irrespective of the purposes of the present invention and consequently are not described herein.

Figure 5:
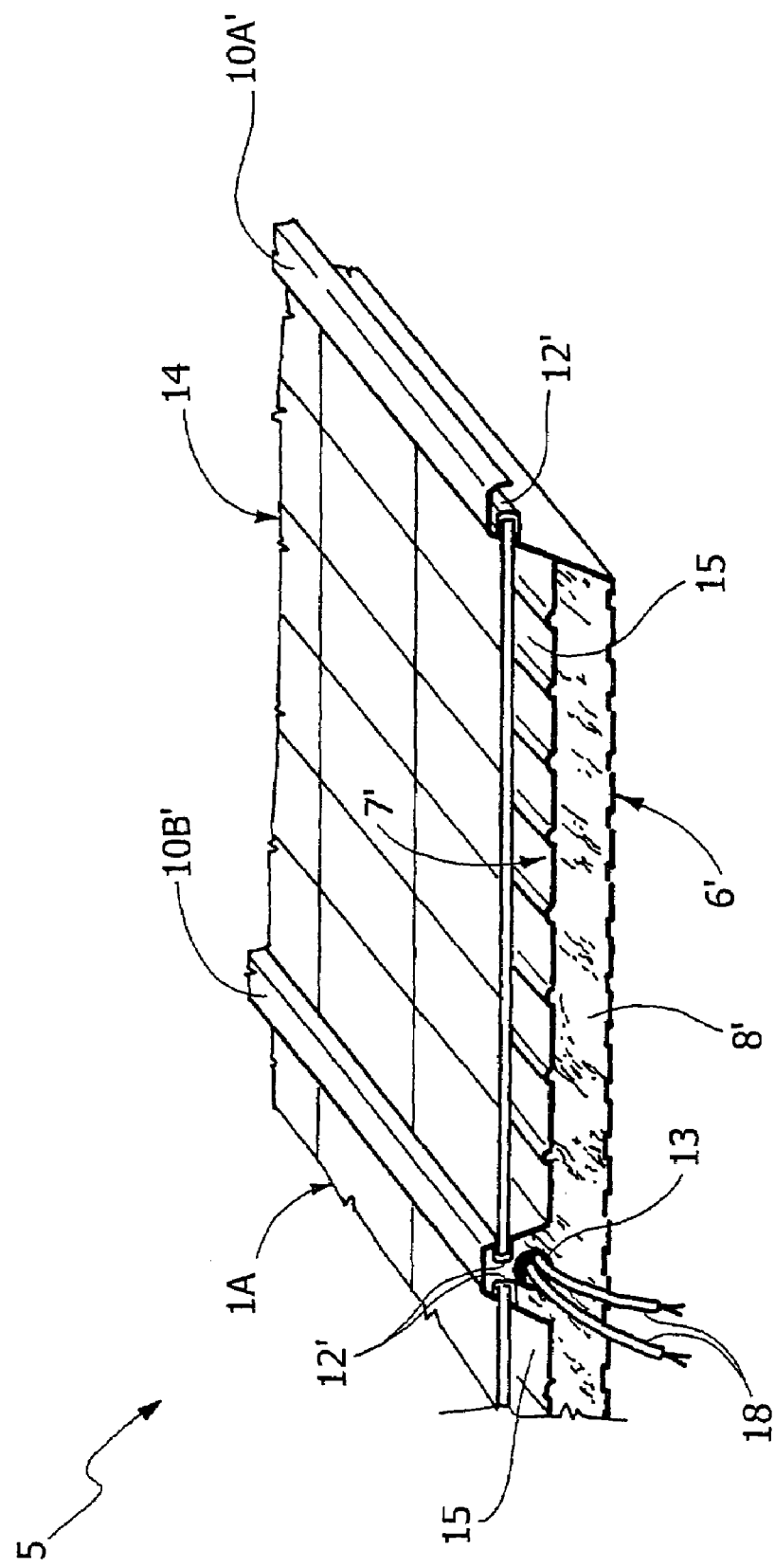
FIG. 5 is a schematic, perspective, and partially cross-sectional view of an insulating panel built in accordance with a first variant of the invention.
Figure 6:
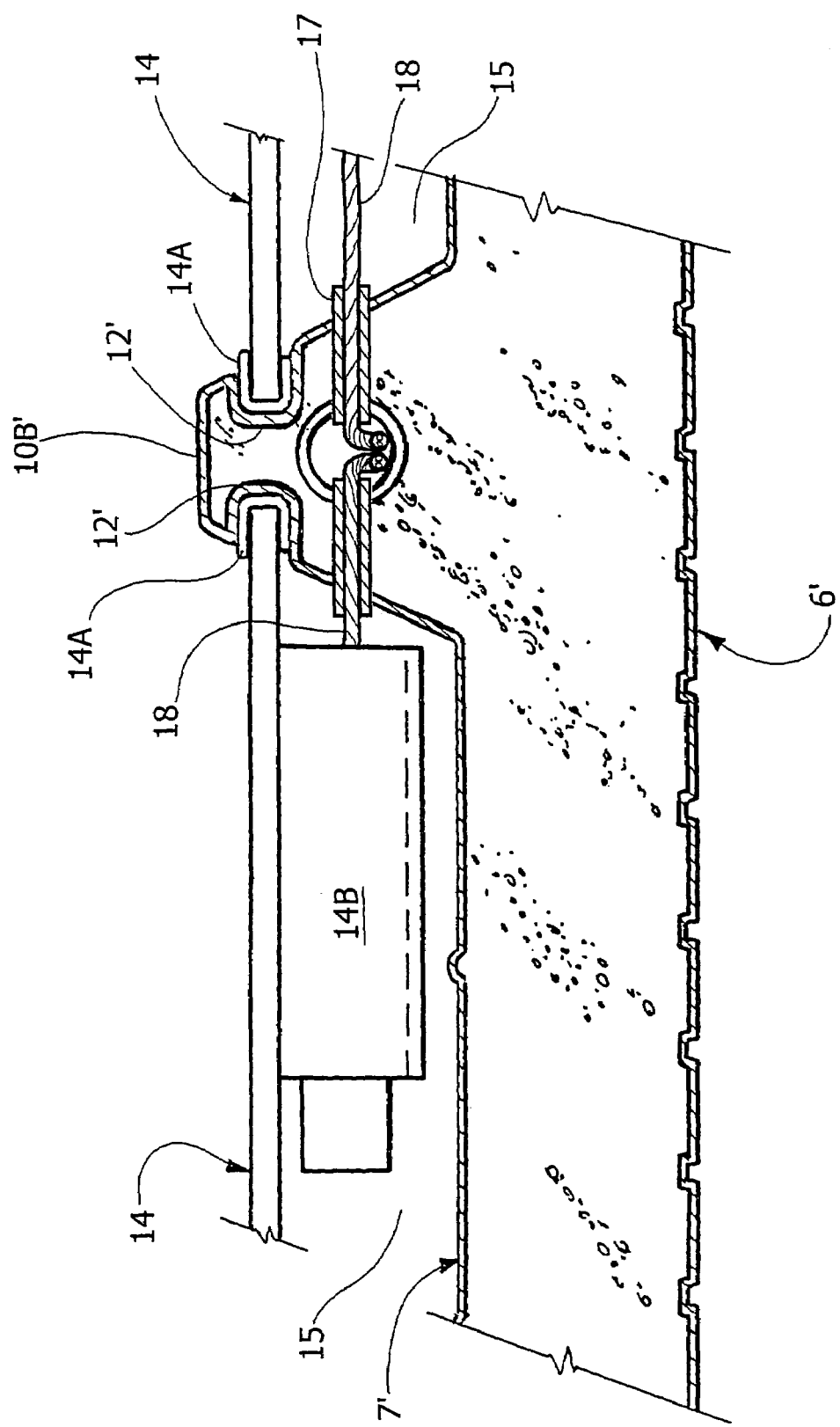
FIG. 6 is a schematic, perspective, and partially cross-sectional view of an insulating panel built in accordance with a second variant of the invention.

FIGS. 5 and 6 illustrate a possible variant embodiment of the invention, in accordance with which the ribbings 10A', 10B', 10C' are shaped for defining grooves or throats 12', instead of projections 12. Said figures use the reference numbers of the preceding figures to indicate elements that are technically equivalent to the ones already described previously.

As may be seen in FIG. 6, in said embodiment the modules 14 are mounted on the panel 5 by inserting the opposite edges of the respective frames 14A into the grooves 12', which basically form seats, in which the opposite edges of the modules themselves can be made to slide until the desired position is reached. Fixing in position of the modules can then occur with modalities in themselves known, for example via clamping members of a known type, for instance screw-operated self-centring clamping members, mounted directly within the grooves 12', in a position corresponding to the two longitudinal ends of the module 14, or else via external elements or brackets.

Also the positioning grooves 12' can be obtained in the course of the step of shaping of the sheets 6', 7'. For the rest, construction of the panel 5 integrating the photovoltaic modules 14 is obtained adopting modalities similar to the ones described previously.

In the embodiment represented in FIGS. 5 and 6, the panel 5 is equipped with a single tube 13, in a position corresponding to the central ribbing 10B', on which there will be installed the cable-leads 17 for the cables 18 of the modules 14 mounted on the right and on the left of the ribbing itself. In the case exemplified, the tube 13 is positioned underneath and substantially tangentially with respect to the grooves 12', with the cable-leads 17 directly facing or projecting into the two chambers 15 of the panel 5 represented.

The tube 13 could in any case be positioned between the two channels 12' of the ribbing 10B' and/or substantially adjacent to the top wall of a deep ribbing. Such a case is visible in FIG. 4, where a tube 13' represented by dashed lines is set within the ribbing 10C', in a position corresponding to its top, and is mounted on the latter passing through a single cable-lead 17", which is also represented hatched. In this case, the cables 18 coming from the box 14B can reach the cable-lead 17" passing through a minimal gap left between the longitudinal ends of adjacent modules 14.

From the foregoing description, the characteristics and advantages of the present invention emerge clearly.

The component 5 described is a covering panel, which can be numbered amongst monolithic prefabricated modular components, equipped with one or more respective photovoltaic units 14 already in position and provided with respective cables for connection, ready for installation. The structure of the panel 5 described, in addition to being simple and hence of contained cost, enables a considerable degree of modularity, understood as the possibility of associating a number of panels to one another to obtain a continuous covering. The system of construction proposed likewise enables panels of dimensions that may be different from one another to be obtained, without this causing substantial variations in the production cycle, which may thus be a cycle of continuous processing. In said perspective, the panels 5 may be obtained, in the course of the production process, of the desired length according to the specific requirements of the end user, and can then be equipped with a number of modules 14 depending upon the requirements of the user himself.

It may be noted that the panels 5 do not constitute a mere support for the modules 14, but themselves form a roof and at the same time, if so desired, a false ceiling for the building (in which case the respective sheets 6' will be painted or surface treated).

The installation of the panels 5, which is obtained with modalities similar to the ones envisaged according to the known art, thus makes it possible at the same time both to obtain external surfaces of a building (and possibly, as has been said, also internal surfaces) and to achieve pre-arrangement of a photovoltaic system, without the need for specific frameworks for supporting the modules 14.

Of course, without prejudice to the principle of the invention, the details of construction and the embodiments may vary widely with respect to what is described and illustrated herein.

In the embodiment exemplified in FIG. 3, a tube 13 is set in a position corresponding to each projection 12 of the ribbings 10A', 10B', 10C'. It is, however, clear that the panel 5 could envisage just two tubes 13, for example each in a position corresponding to a side ribbing 10A', 10C' or else both in a position corresponding to the central ribbing 10B', or even a single tube 13, in a position corresponding to the central ribbing 10B', as in the case of FIG. 5 or FIG. 6. As has been said, the tube 13 must not necessarily have to be set in a position corresponding to a projection 12.

The tubes 13 could even be omitted, in which case the ducts for the passage of the cables 18 could be formed directly by an area of a respective ribbing, in particular a projection 12. Also this possibility is exemplified schematically in FIG. 4, where the reference number 20 designates a possible additional wall, formed for example by a suitable adhesive tape. In said embodiment, after the formation of the structure formed by the sheets 6', 7', the projection 12 is closed longitudinally via the tape 20. Subsequently, in the remaining part of the space between the sheets 6', 7' there is introduced the insulating mass 8', for example in the form of foam, which thus fills every interstice, with the exception of the area designated by 21, which can then be exploited as pipe for the passage of the cables 18.

In the embodiments exemplified in the figures, the ribbings 10A', 10B', 10C' are built via continuous shaping of the respective sheet metal. Moreover, nothing prevents making said ribbings and/or the respective projections 12 or channels 12' in another way, for example via processes of pressing or drawing or other mechanical deformation executed on the sheets 6', 7'. The shape of the deep ribbings could be obviously different from the trapezoidal one exemplified previously.

The insulating or non-conducting material 8 could be made of mineral fibre, rather than of a layer of foamed material, and the bottom sheet 6' could be made of a non-metallic rigid or semi-rigid material, for example asphaltic-felt roofing, plastic reinforced with fibreglass, or fibreglass.

The application of the invention must not be understood as limited to the use of the panels 5 for the purposes of constructing roofing, it being possible for the panels themselves to be in fact used for covering or forming surfaces or side walls of buildings. The panels 5 can of course be used also for the purposes of constructing roofs different from what is illustrated by way of example in FIG. 1, such as for example flat roofs, single-pitch roofs, double-pitch roofs, etc.

Obviously, according to the need, the module or modules 14 mounted on a panel 5 may not occupy the entire longitudinal development of the panel itself.

What is claimed is:

1. A prefabricated insulating panel for roofing buildings, comprising:

an upper sheet of metal material;

a lower sheet made of rigid or semi-rigid material; and a layer of insulating material arranged between the upper sheet and the lower sheet;

wherein the upper sheet defines a plurality of substantially parallel longitudinal ribs that rise from a general plane of a respective face of the panel, the ribs extending according to a longitudinal direction of the panel;

wherein at least a first rib and a second rib of said plurality of ribs support a photovoltaic module at opposed peripheral portions thereof, the module being supported in a plane of lie which is raised with respect to said general plane, said plane of lie being spaced apart from said general plane such that said module, said first rib, said second rib and a portion of said upper sheet which extends between said first and second ribbings delimit at least part of a chamber; and wherein between the upper and the lower sheet there is present at least one pipe extending in a longitudinal direction of the panel, the pipe receiving cables for electrical connection of said module.

2. The panel according to claim 1, wherein said module has a peripheral metal frame and said first and second ribs support said module at opposed peripheral portions of said frame.

3. The panel according to claim 1, wherein each of said first and second ribs has a top longitudinal face and two side longitudinal faces, said top longitudinal face lying on a first plane, in at least one of said side longitudinal faces a resting surface is defined, onto which a respective one of said peripheral portions of the module is supported at a lower surface thereof, the resting surface lying on a second plane which is substantially parallel to and spaced apart from said first plane and said general plane, the module has an upper surface lying on a third plane which is parallel and intermediate to said first plane and said second plane.

4. The panel according to claim 3 wherein said first and second rib each has, at a respective one of said side longitudinal faces, a longitudinal groove having a C-shaped cross-section, which groove forms a seat within which a respective peripheral portion of said module is inserted, the groove of the first rib facing the groove of the second rib, each groove defining a respective one said resting surface.

5. The panel according to claim 1, wherein said pipe extends within one of said ribs, in a longitudinal direction thereof.

6. The panel according to claim 1, wherein said pipe extends substantially throughout the whole longitudinal development of the panel.

7. The panel according to claim 1, wherein said pipe comprises a tube.

8. The panel according to claim 7, wherein said tube is kept in position via said insulating material.

9. The panel according to claim 3, wherein said upper and lower surfaces of said peripheral portions belong to a peripheral frame of the module.

10. The panel according to claim 1, further comprising clamping means for clamping the module to the panel, the clamping means comprising a clamping member having a body comprising a first portion and a second portion, the first portion being secured above an upper region of a respective one of said ribs such that the second portion overhangs an upper surface of the module only at a respective one of the peripheral portions thereof.

11. The panel according to claim 10, wherein one of a gasket and a resilient member is arranged between said second portion of the body of the clamping member and said upper surface of the module.

12. The panel according to claim 1, wherein said plurality of ribs comprises a number of third ribs parallel to each other and to said first and second ribs, the third ribs being defined by said upper sheet in a position intermediate to said first and second ribs, each third rib having an upper tip, the tips of the third ribs being on a plane which is intermediate to said general plane and said second plane.

13. The panel according to claims 3, wherein said first rib has, at each of said side longitudinal faces, one said resting surface.

14. The panel according to claims 4, wherein said first rib has, at each of said side longitudinal faces, one said groove.

15. The panel according to claim 1, wherein said module bears, at a rear face thereof, a connection box which extends within said chamber.

16. The panel according to claim 15, further comprising a cable-lead device, mounted at a respective through passage of said upper sheet and that extends between said pipe and the outside of the panel, an electric cable extending between said connection box and said pipe, having an intermediate portion passing through said cable-lead device.

17. The panel according to claim 1, wherein fixed to the panel itself there are means for clamping said module in position, said means for clamping comprising brackets secured to a respective one of said first and second ribs.

18. A prefabricated insulating panel for roofing buildings, comprising an upper sheet of metal material, a lower sheet of rigid or semi-rigid material, and a layer of insulating material arranged between the upper and the lower sheets, wherein the upper sheet defines a plurality of substantially parallel longitudinal ribs that rise from a general plane of an upper face of the panel, wherein at least a first and a second of said ribs support one photovoltaic module at opposed peripheral portions thereof, such that the module lies on a plane of lie which is raised with respect to said general plane, said plane of lie being spaced apart from said general plane such that said module, said first ribs, said second ribs and a portion of said upper sheet that extends between said first and second ribs delimit at least part of a chamber, wherein between the upper and the lower sheet at least one pipe extend in a longitudinal direction of the panel, the pipe receiving cables for electrical connection of the module, wherein the module has a peripheral frame, and wherein each of said first and second ribs have a top longitudinal face and two side longitudinal faces, the upper face lying on a first plane, in at least one of said side faces a resting surface is defined, onto which a lower surface of the frame of the photovoltaic module is supported, the resting surface lying on a second plane which is substantially parallel to and spaced apart from said first plane, the panel further comprising clamping means for fixing the module to the panel, the clamping means comprising a clamping member having a body including a first portion and a second portion, the first portion being secured above an upper region of a respective one of said ribs such that the second portion overhangs an upper surface of the module only at a respective one of the peripheral portions thereof.

19. The panel according to claim 18, wherein said pipe comprises a tube that extends within one of said ribs, in a longitudinal direction thereof and is kept in position via said insulating material.

20. The panel according to claim 19, wherein one of a gasket and a resilient member is arranged between said second portion of the body of the clamping member and said upper surface of the module.

* * * * *